Patented Mar. 21, 1933

1,902,257

UNITED STATES PATENT OFFICE

WILLIAM HENRY MOSS, OF CUMBERLAND, MARYLAND, ASSIGNOR TO CELANESE CORPORATION OF AMERICA, A CORPORATION OF DELAWARE

DERIVATIVE OF CELLULOSE COMPOSITION

No drawing.   Application filed May 13, 1929. Serial No. 362,851.

This invention relates to the preparation of compositions containing cellulose derivatives and resins formed from vinyl compounds, and relates more particularly to such compositions wherein synthetic resins compatible with the derivatives of cellulose are employed.

An object of my invention is to prepare compositions such as coating compositions, dopes, plastic masses, etc., containing a derivative of cellulose, a synthetic resin compatible with the cellulose and a polymerized vinyl compound.

Resins formed by the condensation of vinyl compounds have many desirable properties, but when attempt is made to form coating or plastic compositions containing such vinyl resins and derivatives of cellulose, satisfactory results are not obtained since the vinyl resins are not completely compatible with such derivatives of cellulose as cellulose acetate. I have found that if synthetic or natural resins compatible with the derivative of cellulose are added to the mixture containing the derivative of cellulose and the vinyl resin, solutions may be formed wherein all the constituents are compatible.

In accordance with my invention I prepare compositions, such as plastic or coating compositions containing a derivative of cellulose, a synthetic or natural resin compatible therewith and a resin formed by the condensation of a vinyl compound. The composition may also contain one or more natural or synthetic resins or gums, plasticizers, low boiling, medium boiling, and/or high boiling solvents and pigments and/or dyes.

The solutions thus formed may be employed as lacquers or coating compositions for metals, glass, fabrics, or other surfaces and may also be employed for making photographic or other films. Artificial yarns may be formed by extruding the solutions made in accordance with my invention through the orifices of a spinneret either into a heated evaporative atmosphere as in dry spinning or into a precipitating bath as in wet spinning. The solutions may also be employed as adhesives, and are particularly useful in this connection for making shatterless glass by causing celluloid sheets to adhere to surfaces of sheets of glass between which they are placed.

The plastic compositions made in accordance with my invention, may be worked into sheets which may also be used for making laminated glass, and also may be worked into blocks or articles in any known manner. Such sheets or blocks are clear, homogeneous and transparent, and have useful properties of toughness and strength such as are very desirable in any technical applications.

Another application of my invention is in the preparation of a molding powder containing the derivative of cellulose, the resin compatible therewith and the vinyl resin in intimate admixture, which powder may be molded at elevated temperature and pressure to coalesce and form articles of any desired shape.

The derivative of cellulose that may be used for making the solutions, coating or plastic compositions may be any suitable one such as cellulose nitrate or on organic derivative of cellulose such as organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

Any suitable synthetic resin compatible with the derivative of cellulose may be employed in my invention. Examples of these are the fusible and soluble phenol formaldehyde resins prepared in the presence of an acid catalyst, diphenylol propane-formaldehyde resins, the resins formed by the condensation of sulfonamids, such as toluene sulfonamid, xylene sulfonamid or benzene sulfonamid with formaldehyde, the resins formed by the heating of lactic acid under reflux, phenol furfural resins, acetone furfural resins, aniline furfural resins, etc. Of the natural resins compatible with organic derivatives, accaroid and guaiac may be mentioned.

Any suitable resin formed by the polymerization of vinyl compounds may be employed. By vinyl compounds is meant any compound having the $CH_2=CH$ group therein, examples of which are vinyl acetate, vinyl halides or styrene ($C_6H_5CH=CH_2$). The vinyl resins may be prepared by the polymerization of the same through the action of ultra violet light in the absence or presence of catalysts such as uranium salts. I prefer to employ a vinyl resin that is in the hardest form attainable by polymerization.

The low boiling point solvent that may be employed may be one or a mixture of two or more of the following: acetone, alcohol, benzene, methylene chloride, ethylene dichloride, depending upon the solubility characteristics of the derivative of cellulose used. Examples of medium and/or high boiling solvents are ethyl lactate, tetrachlorethane, the monomethyl ether of ethylene glycol, dioxan, benzyl alcohol or diacetone alcohol. Examples of suitable plasticizers are diethyl phthalate, dibutyl tartrate, triacetin, ethyl toluene sulfonamid, diphenylol propane, etc.

As stated, small proportions of natural resins or gums that are not compatible with organic derivatives of cellulose may also be added, of which the following may be mentioned, manila, accaroides, pontianak, kauri, dammar, rosin and shellac, or the semi-synthetic resin, ester gum.

By compatible is meant that the resin employed or the quantity of vinyl compound employed and the derivative of cellulose should be soluble in a common solvent or mixture of solvents to form clear and homogeneous solutions, which solutions upon evaporation, form clear and homogeneous films from which the resin, the vinyl compound or derivative of cellulose is not precipitated.

In order further to illustrate my invention but without being limited thereto, the following specific examples are given.

*Example I*

| | Parts by weight |
|---|---|
| Vinyl acetate resin | 100 |
| Diphenylol propane - formaldehyde resin | 30 |
| Cellulose acetate | 30 |
| Acetone | 300 |

*Example II*

| | Parts by weight |
|---|---|
| Vinyl acetate resin | 100 |
| Diphenylol propane - formaldehyde resin | 15 |
| Cellulose acetate | 20 |
| Acetone | 300 |
| Ethyl alcohol | 100 |
| Benzene | 100 |
| Ethyl lactate or monomethyl ether of ethylene glycol | 30 |

*Example III*

| | Parts by weight |
|---|---|
| Vinyl acetate resin | 100 |
| Toluene sulfonamid - formaldehyde resin | 45 |
| Cellulose acetate | 30 |
| Diethyl phthalate | 10 |
| Acetone | 400 |
| Ethyl acetate | 100 |
| Benzene | 100 |
| Dioxan | 100 |

It is to be understood that the foregoing detailed description is given merely by way of illustration, and that many variations may be made therein without departing from the spirit of my invention.

Having described my invention, what I claim and desire to secure by Letters Patent is:

1. A composition of matter containing cellulose acetate, a polymerized vinyl compound in greater quantity than is compatible with the cellulose acetate, a synthetic resin selected from the group consisting of phenol-formaldehyde resins, diphenylol propane-formaldehyde resins, aromatic sulfonamid resins, resins formed by the heating of lactic acid under reflux, phenol-furfural resins, acetone-furfural resins and aniline-furfural resins, and a common solvent, synthetic resin being present in sufficient amount so that the resulting product is clear and homogeneous.

2. A coating composition containing cellulose acetate, a polymerized vinyl compound in greater quantity than is compatible with the cellulose acetate, a synthetic resin selected from the group consisting of phenol-formaldehyde resins, diphenylol-propane-formaldehyde resins, aromatic sulfonamid resins, resins formed by the heating of lactic acid under reflux, phenol-furfural resins, acetone-furfural resins and aniline-furfural resins, and a common solvent including acetone, synthetic resin being present in sufficient amount so that the resulting product is clear and homogeneous.

3. A composition of matter containing 100 parts by weight of a polymerized vinyl acetate resin, 15 to 30 parts of diphenylol propane formaldehyde resin and 20 to 30 parts of cellulose acetate and a common solvent.

In testimony whereof, I have hereunto subscribed my name.

WILLIAM HENRY MOSS.